United States Patent
An et al.

(10) Patent No.: US 8,009,203 B2
(45) Date of Patent: Aug. 30, 2011

(54) DIGITAL PHOTOGRAPHING APPARATUS, TRACKING METHOD, AND RECORDING MEDIUM HAVING RECORDED THEREON A PROGRAM FOR EXECUTING THE TRACKING METHOD

(75) Inventors: Myung-Seok An, Changwon (KR); Hong-Seok Choi, Changwon (KR); In-Su Kim, Changwon (KR); Seok-Ho Jeon, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 340 days.

(21) Appl. No.: 12/427,155

(22) Filed: Apr. 21, 2009

(65) Prior Publication Data
US 2010/0073502 A1    Mar. 25, 2010

(30) Foreign Application Priority Data
Sep. 24, 2008 (KR) ........................ 10-2008-0093859

(51) Int. Cl.
*H04N 5/225* (2006.01)
(52) U.S. Cl. ..................... 348/222.1; 382/103
(58) Field of Classification Search ............... 348/222.1, 348/77, 238, 135, 169, 208.14, 407.1, 422.1, 348/699, 703; 382/103, 107, 236, 291, 209, 382/203, 199, 181, 172, 162
See application file for complete search history.

(56) References Cited

U.S. PATENT DOCUMENTS

| | | | | | |
|---|---|---|---|---|---|
| 5,684,887 | A | * | 11/1997 | Lee et al. | 382/107 |
| 6,724,915 | B1 | * | 4/2004 | Toklu et al. | 382/103 |
| 7,336,830 | B2 | * | 2/2008 | Porter et al. | 382/218 |
| 2009/0154768 | A1 | * | 6/2009 | Bell | 382/103 |
| 2010/0045800 | A1 | * | 2/2010 | Chebil et al. | 348/169 |

OTHER PUBLICATIONS

Borgefors, "Distance Transformations in Digital Images," Computer Vision, Graphics, and Image Processing, vol. 34, pp. 334-371 (1986).
Wikipedia, "Bayes' theorem," Wikipedia, the free encyclopedia, retrieved from internet website: http://en//wikipedia.org/wiki/Bayes%27_theorem.

* cited by examiner

*Primary Examiner* — Sinh Tran
*Assistant Examiner* — Kent Wang
(74) *Attorney, Agent, or Firm* — Drinker Biddle & Reath LLP (57) ABSTRACT

A digital photographing apparatus, a tracking method, and a recording medium having recorded thereon a program for executing the tracking method are provided which effectively determine a target image as a partial image corresponding to a reference image in a frame image. The digital photographing apparatus includes: an image pickup device; a mask preparer which prepares a mask having the same size as a reference image that is smaller than a current frame image; a matching data obtainer which obtains a plurality of pieces of matching data by applying the mask to a plurality of matching images having the same size as the reference image; and a target image determiner which determines one of the matching images as a target image by using the matching data.

13 Claims, 6 Drawing Sheets

DIGITAL PHOTOGRAPHING APPARATUS, TRACKING METHOD, AND RECORDING MEDIUM HAVING RECORDED THEREON A PROGRAM FOR EXECUTING THE TRACKING METHOD

CROSS-REFERENCE TO RELATED PATENT APPLICATION

This application claims the benefit of Korean Patent Application No. 10-2008-0093859, filed on Sep. 24, 2008 in the Korean Intellectual Property Office, the entire contents of which is incorporated herein by reference.

BACKGROUND OF THE INVENTION

1. Field of the Invention

The present invention relates to a digital photographing apparatus, a tracking method, and a recording medium having recorded thereon a program for executing the tracking method. More particularly, the present invention relates to a digital photographing apparatus which can effectively determine a target image that is a partial image corresponding to a reference image in a frame image, a tracking method, and a recording medium having recorded thereon a program for executing the tracking method.

2. Description of the Related Art

A conventional digital photographing apparatus obtains data from light that is incident on an image pickup device and stores the data in a storage medium or displays an image of the data on a display unit. Specifically in the case of a digital photographing apparatus, such as a closed-circuit television (CCTV) surveillance camera, movement of a certain subject may be tracked by obtaining data from light incident on a image pickup device, analyzing the obtained data, and determining a target image as a partial image corresponding to a reference image in a frame image from the obtained data.

However, in various cases, such as when it is difficult to classify a background and the subject, a conventional digital photographing apparatus may fail to properly track the subject and mistakenly recognize the background as an object to be tracked, instead of the subject.

SUMMARY OF THE INVENTION

The present invention provides a digital photographing apparatus for effectively determining a target image as a partial image corresponding to a reference image in a frame image, a tracking method, and a recording medium having recorded thereon a program for executing the tracking method.

According to an embodiment of the present invention, a digital photographing apparatus is provided. The digital photographing apparatus includes: an image pickup device which generates data from incident light; a mask preparer which prepares a mask having the same size as a reference image that is smaller than a current frame image, the mask to be applied to the current frame image to search for a target image that matches the reference image in the current frame image; a matching data obtainer which obtains a plurality of pieces of matching data by applying the mask to a plurality of matching images having the same size as the reference image, the plurality of matching images being parts of the current frame image; and a target image determiner which determines one of the matching images as a target image by using the matching data, wherein the mask preparer prepares at least one of: a color mask which, when applied to one matching image of the current frame image, gives a weight $W_c(i,j)$ to an $(i,j)$ pixel of the one matching image according to a difference between a color data value of a corresponding pixel of the reference image and an average color data value of the reference image; a difference mask which, when applied to one matching image of the current frame image, gives a weight $W_D(i,j)$ to an $(i,j)$ pixel of the one matching image according to a difference between a data value of a corresponding pixel of the reference image and a data value of a corresponding pixel of a target image in a previous frame image; and a resize mask which, when applied to one matching image of the current frame image, gives a weight $W_R(i,j)$ to an $(i,j)$ pixel, by giving a weight of 1 to pixels of the one matching image corresponding to a rectangular area and giving a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric.

The color mask, when applied to one matching image of the current frame image, may give a weight of 1 to a pixel of the one matching image when a difference between a color data value of a corresponding pixel of the reference image and an average color data value in a predetermined area of the reference image is less than a first predetermined value, and may give a weight less than 1 to the pixel of the one matching image when the difference between the color data value of the corresponding pixel of the reference image and the average color data value in the predetermined area of the reference image is larger than the first predetermined value.

The color mask, when applied to one matching image of the current frame image, may give a weight of 1 to a pixel of the one matching image when a difference between a color data value of a corresponding pixel of the reference image and an average color data value in a predetermined area of the reference image is less than a first predetermined value, may give a weight of $$\frac{k}{sng(R(i,j)-\overline{R})}$$

to the pixel of the one matching image when the difference between the color data value of the corresponding pixel of the reference image and the average color data value in the predetermined area of the reference image is larger than the first predetermined value and Bayesian decision theory is satisfied, wherein k denotes a predetermined constant, $R(i,j)$ denotes a color data value of an $(i,j)$ pixel as the one pixel of the reference image, and $\overline{R}$ denotes the average color data value in the predetermined area of the reference image, and may give a weight of 1 to the pixel of the one matching image when the difference between the color data value of the corresponding pixel of the reference image and the average color data value in the predetermined area of the reference image is larger than the first predetermined value and Bayesian decision theory is not satisfied.

The difference mask, when applied to one matching image of the current frame image, may prepare a binary image by giving a value of 0 to a pixel of the binary image when a difference between a data value of one pixel of the reference image and a data value of a corresponding pixel in a target image in a previous frame image is less than a second predetermined value, and giving a value of 1 to a pixel of the binary image when the difference between the data value of the one pixel of the reference image and the data value of the corresponding pixel in the target image in the previous frame image is larger than the second predetermined value, and then may give a weight of $$\alpha_D + (1-\alpha_D)\frac{CDT(i,j)}{\max_{(i,j)\in M_B}(CDT(i,j))}$$

to a corresponding pixel of the one matching image, wherein $M_B$ denotes the binary image, $\alpha_D$ denotes a predetermined constant between 0 and 1, and CDT(i,j) denotes a Chamfer distance transformation of an (i,j) pixel of the binary image.

When a weight of $$\alpha_D + (1-\alpha_D)\frac{CDT(i,j)}{\max_{(i,j)\in M_B}(CDT(i,j))}$$

is given to the corresponding pixel of the one matching image, a weight of a third predetermined value may be given to the corresponding pixel when the value of $$\alpha_D + (1-\alpha_D)\frac{CDT(i,j)}{\max_{(i,j)\in M_B}(CDT(i,j))}$$

is larger than the third predetermined value.

When $W_A(i,j)$ may denote a weight given to an (i,j) pixel of the matching image by the mask prepared by the mask preparer, $W_U(i,j)$ may have a fifth predetermined value $W_{UMAX}$ when the $W_A(i,j)$ is larger than a fourth predetermined value $W_{AMAX}$, have a seventh predetermined value $W_{UMIN}$ when $W_A(i,j)$ is equal to or less than a sixth predetermined value $W_{AMIN}$, and have a value of $W_A(i,j)$ in other cases, and a reference image to be applied to a following frame image may be determined according to $R_{t+1}(i,j)=W_U(i,j)R_t(i,j)+(1-W_U(i,j))T_t(i,j)$, wherein $R_t(i,j)$ denotes an (i,j) pixel of the reference image, $R_{t+1}(i,j)$ denotes an (i,j) pixel of the reference image to be applied in the following frame image, and $T_t(i,j)$ denotes an (i,j) pixel of a target image determined in the current frame image.

According to another embodiment of the present invention, a tracking method is provided. The tracking method searches for a target image that corresponds the most to a reference image that is smaller than a current frame image in the current frame image. The tracking method includes: preparing a mask having the same size as the reference image and to be applied to the current frame image; obtaining a plurality of pieces of matching data by applying the mask to each of a plurality of matching images having the same size as the reference image, the plurality of matching images being parts of the current frame image; and determining one of the plurality of matching images as a target image by using the plurality of pieces of the matching data, wherein the mask comprises at least any one of: a color mask which, when applied to one matching image of the current frame image, gives a weight $W_C(i,j)$ to an (i,j) pixel of the one matching image according to a difference between a color data value of a corresponding pixel of the reference image and an average color data value of the reference image; a difference mask which, when applied to one matching image of the current frame image, gives a weight $W_D(i,j)$ to an (i,j) pixel of the one matching image according to a difference between a data value of a corresponding pixel of the reference image and a data value of a corresponding pixel of a target image in a previous frame image; and a resize mask which, when applied to one matching image of the current frame image, gives a weight $W_R(i,j)$ to an (i,j) pixel, by giving a weight of 1 to pixels of the one matching image corresponding to a rectangular area and giving a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric.

The color mask, when applied to one matching image of the current frame image, may give a weight of 1 to a pixel of the one matching image when a difference between a color data value of a corresponding pixel of the reference image and an average color data value in a predetermined area of the reference image is less than a first predetermined value, and may give a weight less than 1 to the pixel of the one matching image when the difference between the color data value of the corresponding pixel of the reference image and the average color data value in the predetermined area of the reference image is larger than the first predetermined value.

The color mask, when applied to one matching image of the current frame image, may give a weight of 1 to a pixel of the one matching image when a difference between a color data value of a corresponding pixel of the reference image and an average color data value in a predetermined area of the reference image is less than a first predetermined value, may give a weight of $$\frac{k}{sng(R(i,j)-\overline{R})}$$

to the pixel of the one matching image when the difference between the color data value of the corresponding pixel of the reference image and the average color data value in the predetermined area of the reference image is larger than the first predetermined value and Bayesian decision theory is satisfied, wherein k denotes a predetermined constant, R(i,j) denotes a color data value of an (i,j) pixel as the one pixel of the reference image, and $\overline{R}$ denotes the average color data value in the predetermined area of the reference image, and may give a weight of 1 to the pixel of the one matching image when the difference between the color data value of the corresponding pixel of the reference image and the average color data value in the predetermined area of the reference image is larger than the first predetermined value and Bayesian decision theory is not satisfied.

The difference mask, when applied to one matching image of the current frame image, may prepare a binary image by giving a value of 0 to a pixel of the binary image when a difference between a data value of one pixel of the reference image and a data value of a corresponding pixel in a target image in a previous frame image is less than a second predetermined value, and giving a value of 1 to a pixel of the binary image when the difference between the data value of the one pixel of the reference image and the data value of the corresponding pixel in the target image in the previous frame image is larger than the second predetermined value, and then may give a weight of $$\alpha_D + (1-\alpha_D)\frac{CDT(i,j)}{\max_{(i,j)\in M_B}(CDT(i,j))}$$

to a corresponding pixel of the one matching image, wherein $M_B$ denotes the binary image, $\alpha_D$ denotes a predetermined constant between 0 and 1, and CDT(i,j) denotes a Chamfer distance transformation of an (i,j) pixel of the binary image.

When a weight of $$\alpha_D + (1-\alpha_D)\frac{CDT(i,j)}{\max_{(i,j)\in M_B}(CDT(i,j))}$$

is given to the corresponding pixel of the one matching image, a weight of a third predetermined value may be given to the corresponding pixel when the value of $$\alpha_D + (1-\alpha_D)\frac{CDT(i,j)}{\max_{(i,j)\in M_B}(CDT(i,j))}$$

is larger than the third predetermined value.

When $W_A(i,j)$ denotes a weight given to an (i,j) pixel of the matching image by the mask, $W_U(i,j)$ may have a fifth predetermined value $W_{UMAX}$ when the $W_A(i,j)$ is larger than a fourth predetermined value $W_{AMAX}$, have a seventh predetermined value $W_{UMIN}$ when $W_A(i,j)$ is equal to or less than a sixth predetermined value $W_{AMIN}$, and have a value of $W_A(i,j)$ in other cases, and a reference image to be applied to a following frame image may be determined according to $R_{t+1}(i,j)=W_U(i,j)R_t(i,j)+(1-W_U(i,j))T_t(i,j)$, wherein $R_t(i,j)$ denotes an (i,j) pixel of the reference image, $R_{t+1}(i,j)$ denotes an (i,j) pixel of the reference image to be applied in the following frame image, and $T_t(i,j)$ denotes an (i,j) pixel of a target image determined in the current frame image.

According to another embodiment of the present invention, a recording medium is provided. The recording medium has recorded thereon a program for executing the tracking method described previously.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
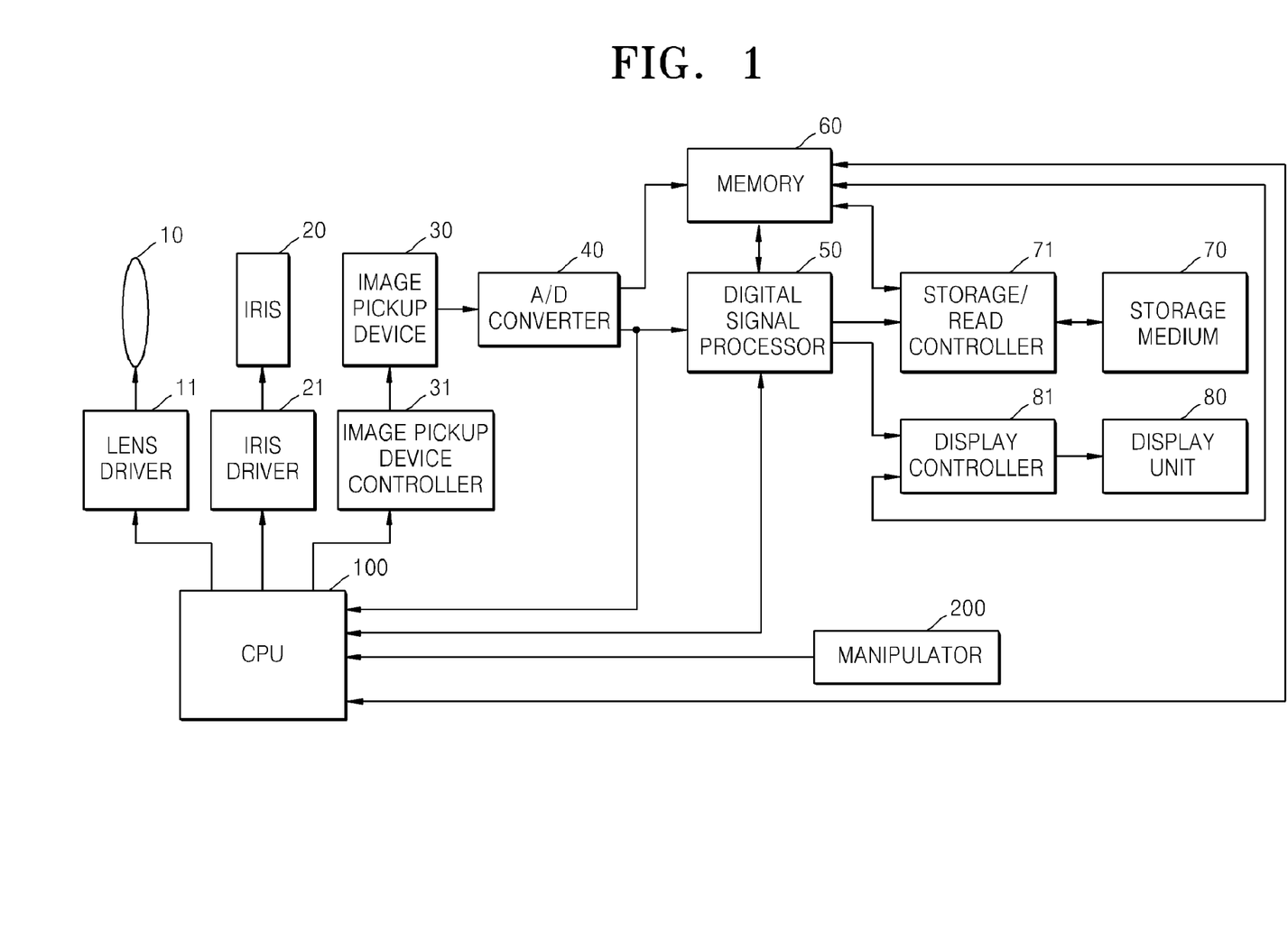
FIG. 1 is a block diagram illustrating an example of a digital photographing apparatus according to an embodiment of the present invention.
Figure 2:
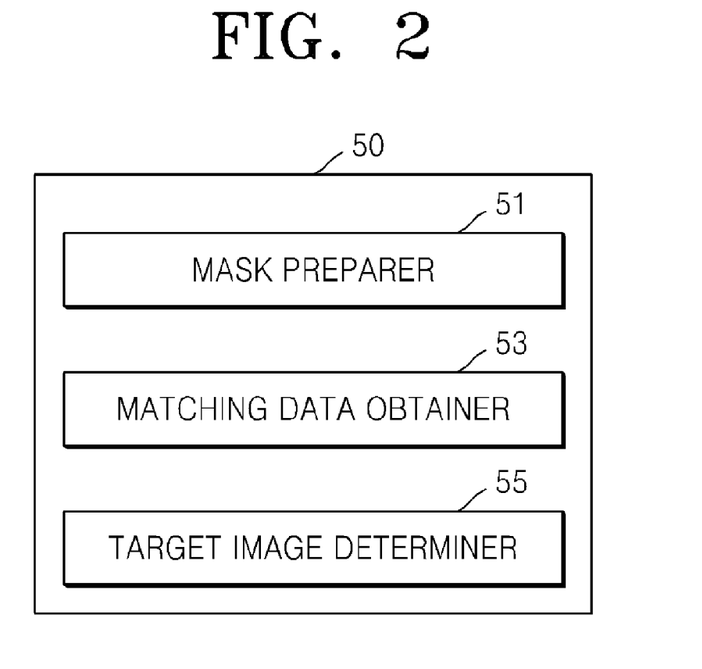
FIG. 2 is a block diagram illustrating an example of a digital signal processor illustrated in FIG. 1.

FIG. 1 is a block diagram illustrating an example of a digital photographing apparatus according to an embodiment of the present invention. FIG. 2 is a block diagram illustrating an example of a digital signal processor 50 illustrated in FIG. 1.

The entire operation of the digital photographing apparatus is controlled by a central processing unit (CPU) 100. The digital photographing apparatus includes a manipulator 200, which includes a key that generates an electric signal, and the like. The electric signal from the manipulator 200 is transmitted to the CPU 100, and the CPU 100 controls the digital photographing apparatus according to the electric signal.

In a photographing mode, upon receiving the electric signal, the CPU 100 controls a lens driver 11, an iris driver 21, and an image pickup device controller 31 according to the electric signal. Accordingly, the location of a lens 10, opening/closing of an iris 20, and sensitivity of an image pickup device 30 are controlled. The image pickup device 30 generates data about an image from incident light, and an A/D converter 40 converts analog data output from the image pickup device 30 to digital data. The A/D converter 40 may not be required according to characteristics of the image pickup device 30.

The data from the image pickup device 30 may be transmitted to a digital signal processor 50 directly or via a memory 60, for example. If required, the data may be transmitted to the CPU 100. Here, examples of the memory 60 include read only memory (ROM) and random access memory (RAM). The digital signal processor 50 may perform a digital signal processing operation, such as gamma correction or white balance adjustment, for example, as an occasion demands. Also, as will be described in more detail later, the digital signal processor 50 includes a mask preparer 51, a matching data obtainer 53, and a target image determiner 55 as illustrated in the example of FIG. 2. Accordingly, the digital signal processor 50 effectively determines a target image, which is a partial image of a frame image and corresponds to a reference image. The mask preparer 51, the matching data obtainer 53, and the target image determiner 55 may be separate elements, for example, instead of being included in the digital signal processor 50, or may be parts of other elements. In other words, it is sufficient so long as the digital photographing apparatus includes the mask preparer 51, the matching data obtainer 53, and the target image determiner 55. Functions of the mask preparer 51, the matching data obtainer 53, and the target image determiner 55 will be described in more detail in the following description.

The data from the digital signal processor 50 is transmitted to a display controller 81 directly or via the memory 60. The display controller 81 controls a display unit 80 to display the image on the display unit 80. Also, the data from the digital signal processor 50 is transmitted to a storage/read controller 71 directly or via the memory 60. The storage/read controller 71 stores the data in a storage medium 70 automatically or according to a signal from the user. Alternatively, the storage/read controller 71 may read the data about an image from a file stored in the storage medium 70, and transmits the read data to the display controller 81 via the memory 60 or via another path so that the display unit 80 displays the image. The storage medium 70 may be removable from or fixed to the digital photographing apparatus.

Not all elements described above are essential in the digital photographing apparatus according to the current embodiment. In other words, the lens driver 11 and the iris driver 21 may not be included in the digital photographing apparatus. It is sufficient so long as the digital photographing apparatus includes the image pickup device 30, the mask preparer 51, the matching data obtainer 53, and the target image determiner 55.

Figure 3:
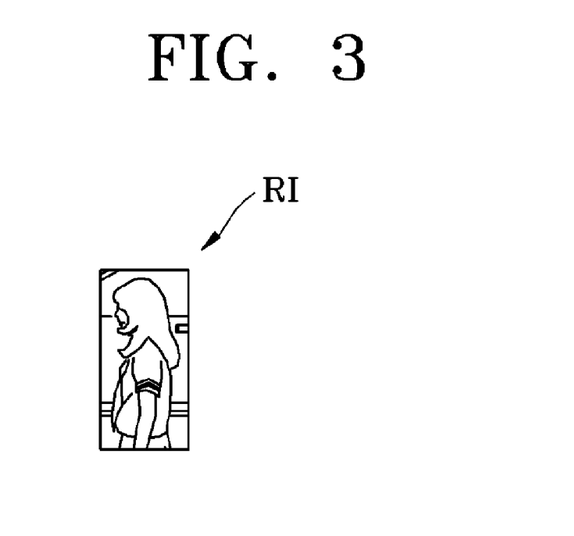
FIG. 3 is a diagram illustrating an example of a reference image.
Figure 4:
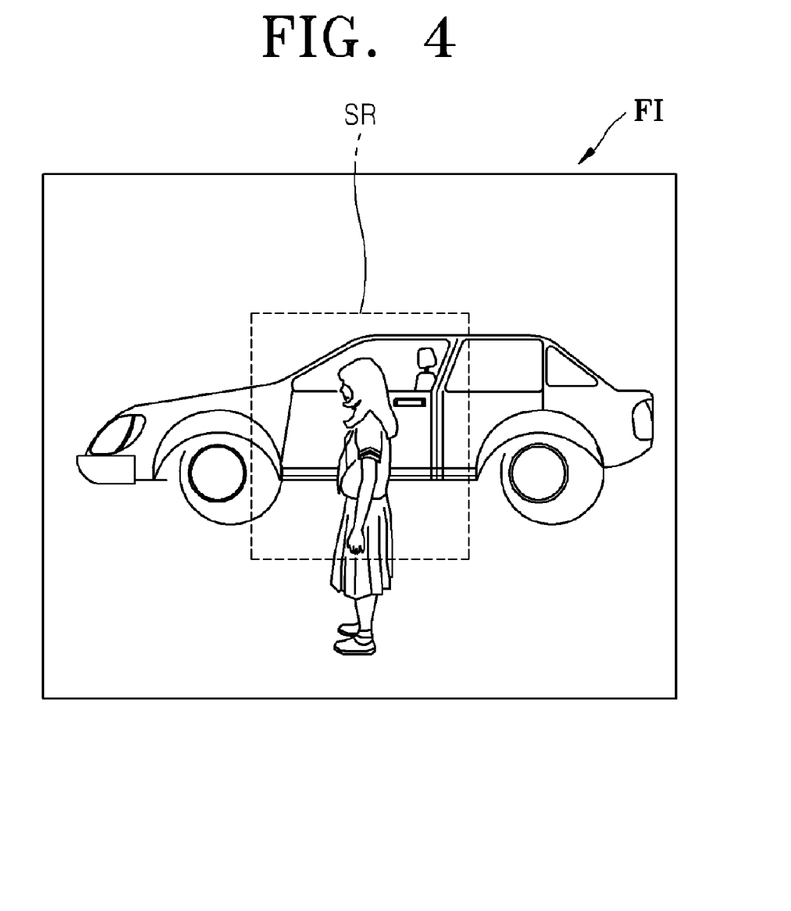
FIG. 4 is a diagram illustrating an example of a frame image and a search range.
Figure 5:
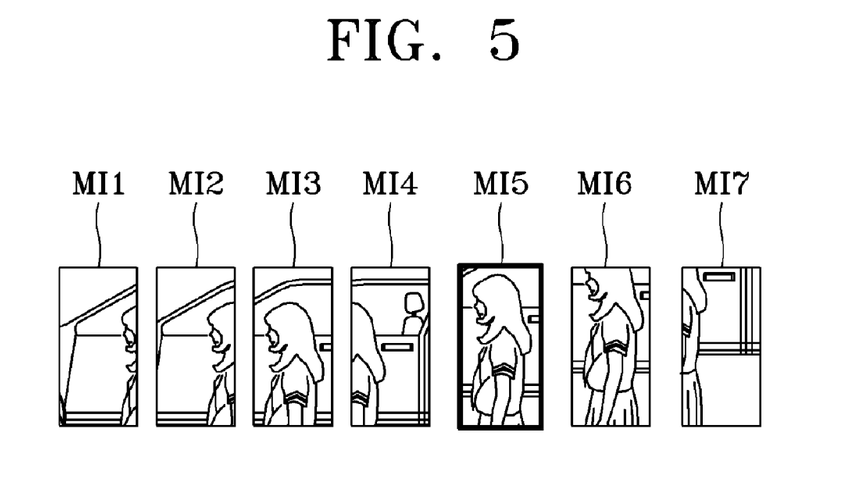
FIG. 5 is a diagram illustrating examples of matching images.

FIG. 3 is a diagram illustrating an example of a reference image RI. FIG. 4 is a diagram illustrating an example of a frame image FI and a search range SR. FIG. 5 is a diagram illustrating examples of matching images MI1, MI2, MI3, MI4, MI5, MI6, and MI7.

The reference image RI illustrated in the example of FIG. 3 denotes an image of a subject to be tracked. The frame image FI illustrated in the example of FIG. 4 denotes one frame image of a moving image, when the moving image is obtained by a digital photographing apparatus. The search range SR denotes a part compared with the reference image RI in the frame image FI, so as to determine a target image, which is a partial image corresponding to the reference image RI, in the frame image FI. Conventionally, when a target image is determined in a $t-1^{th}$ frame image, and then again is determined in a $t^{th}$ frame image, the location of the target image in the $t^{th}$ frame image is not far from the location of the target image in the $t-1^{th}$ frame image. Accordingly, a search range SR in the $t^{th}$ frame image may be a range that is twice or triple the size of the target image in the $t-1^{th}$ frame image or a range prepared by adding a predetermined number of pixels to the length and breath size of the target image of the $t-1^{th}$ frame image, based on the location of the target image of the $t-1^{th}$ frame image.

The matching images MI1, MI2, MI3, MI4, MI5, MI6, and MI7 illustrated in the examples of FIG. 5 are arbitrary images having the same size as the reference image RI in the search range SR of FIG. 4. FIG. 5 illustrates examples of 7 matching images MI1, MI2, MI3, MI4, MI5, MI6, and MI7, but the number of matching images is not limited thereto, and may vary according to the size, or the like, of the search range SR. The matching images MI1, MI2, MI3, MI4, MI5, MI6, and MI7 are candidates of a target image, and one of the matching images MI1, MI2, MI3, MI4, MI5, MI6, and MI7 that corresponds most closely to the reference image RI is determined as the target image. For example, the matching image MI5 of FIG. 5 corresponds most closely to the reference image RI of the example of FIG. 3, and thus the matching image MI5 becomes the target image.

Determining of a target image performed by a digital photographing apparatus, according to an embodiment of the present invention will now be described with reference to the examples of FIGS. 6 through 8D.

Figure 6:
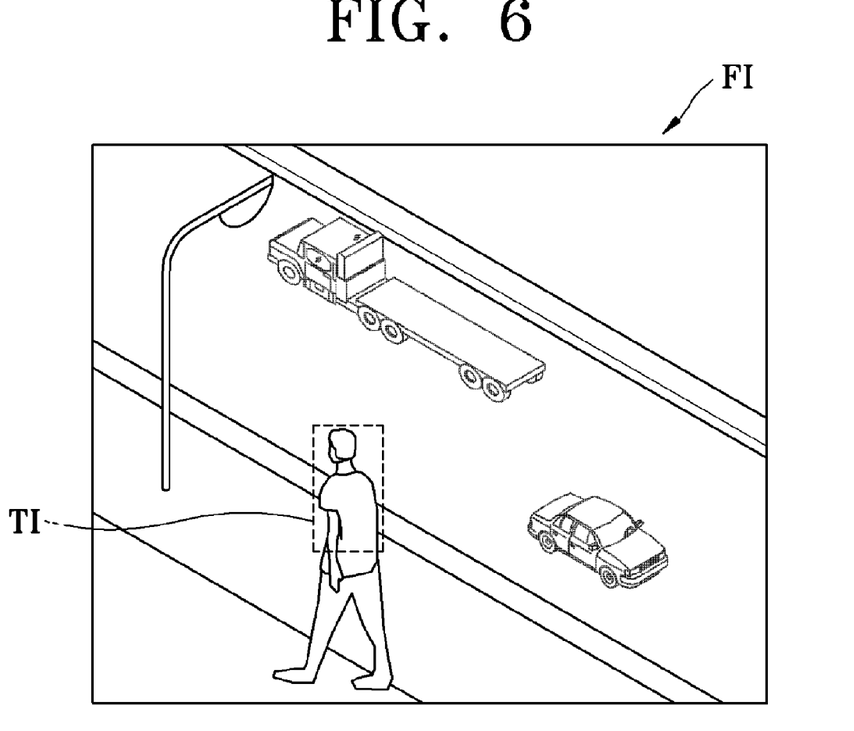
FIG. 6 is a diagram illustrating an example of a frame image and a target image.
Figure 7:
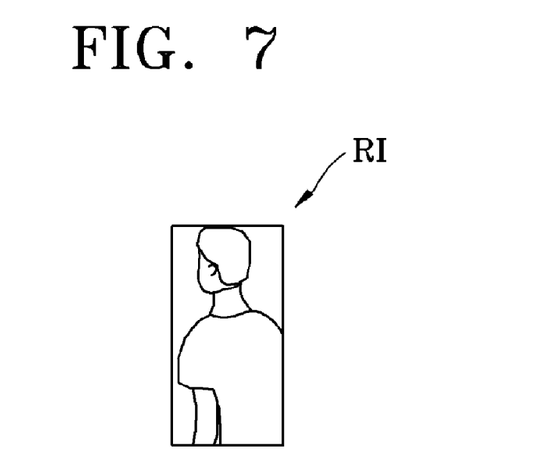
FIG. 7 is a diagram illustrating an example of a reference image.

FIG. 6 is a diagram illustrating an example of a frame image FI and a target image TI. FIG. 7 is a diagram illustrating an example of a reference image RI. When a part that corresponds to the reference image RI of FIG. 7 is accurately tracked in the frame image FI of FIG. 6, a partial image of the frame image FI is determined as the target image TI. In the example of FIG. 7, the size of the reference image RI is drawn larger than the size of the target image TI of the example of FIG. 6 for convenience, but they are actually the same size.

The mask preparer 51 of the example of FIG. 2 prepares a mask. The mask is applied to the current frame image FI to search for the target image TI that corresponds the most to the reference image RI that is smaller than the current frame image FI. The mask has the same size as the reference image RI. When the mask preparer 51 prepares the mask, the matching data obtainer 53 obtains a plurality of pieces of matching data by applying the mask to each of a plurality of matching images having the same size as the reference image RI. Here, the plurality of matching images are partial images of the current frame image FI. Then, the target image determiner 55 determines one of the matching images as the target image TI by using the plurality of pieces of matching data.

Conventionally, a normalized correlation coefficient (NCC) is utilized to determine a matching image that is most similar to a reference image from among a plurality of matching images as a target image. Considering a reference image having I pixels widthwise and J pixels lengthwise, wherein i=0, 1, through to I−1 and J=0, 1, through to J−1, NCC with respect to one matching image is calculated as given by Equation 1. In Equation 1, R(i,j) denotes a data value of an (i,j) pixel of the reference image, $\overline{R}$ denotes an average of data values of all pixels in the reference image, M(i,j) denotes a data value of an (i,j) pixel on the one matching image, and $\overline{M}$ denotes an average of data values of all pixels in the one matching image.

$$NCC = \frac{\sum_{i=0}^{I-1}\sum_{j=0}^{J-1}(R(i,j)-\overline{R})(M(i,j)-\overline{M})}{\sqrt{\sum_{i=0}^{I-1}\sum_{j=0}^{J-1}(R(i,j)-\overline{R})^2}\sqrt{\sum_{i=0}^{I-1}\sum_{j=0}^{J-1}(M(i,j)-\overline{M})^2}} \quad (1)$$

Accordingly, NCCs of each matching image are calculated, and the results of these calculations are a plurality of pieces of matching data. A conventional digital image photographing apparatus determines a matching image having the highest NCC as a target image. However, the conventional digital image photographing apparatus does not give an accurate result. Accordingly, in the digital photographing apparatus according to the current embodiment of the present invention, the matching data obtainer 53 calculates an adaptive weighted correlation coefficient (AWCC) according to Equation 2, by using a suitable mask prepared by the mask preparer 51.

$$AWCC = \frac{\sum_{i=0}^{I-1}\sum_{j=0}^{J-1}W_A(i,j)(R(i,j)-\overline{R})(M(i,j)-\overline{M})}{\sqrt{\sum_{i=0}^{I-1}\sum_{j=0}^{J-1}(R(i,j)-\overline{R})^2}\sqrt{\sum_{i=0}^{I-1}\sum_{j=0}^{J-1}(M(i,j)-\overline{M})^2}} \quad (2)$$

Here, $W_A(i,j)$ denotes a mask value in one of pixels of the mask corresponding to an (i,j) pixel of the matching image. According to the digital photographing apparatus, the matching data obtainer 53 obtains matching data (AWCC) of each matching image by using the mask prepared by the mask preparer 51, and the target image determiner determines one of the matching images that is most similar to the reference image as the target image by considering the matching data.

When the AWCC is calculated by changing NCC as given by Equation 2, the AWCC of each matching image is calculated, and then a matching image having the highest AWCC is determined as a target image.

An example of a mask prepared by the mask preparer 51 will now be described in detail.

Figure 8A:
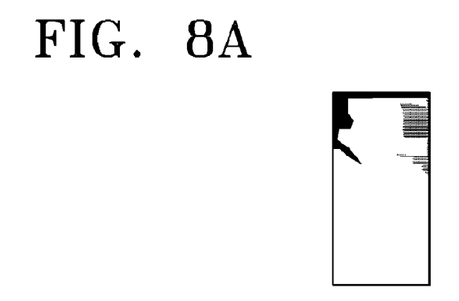
FIG. 8A is a diagram illustrating an example of a color mask.

FIG. 8A is a diagram illustrating an example of a color mask. When the color mask is applied to one matching image of the current frame image FI of the example of FIG. 6, the color mask gives a weight of $W_C(i,j)$ to an (i,j) pixel of the one matching image according to a difference between a color data value of a corresponding pixel of the reference image RI of the example of FIG. 7 and an average color data value of the reference image RI. In the reference image RI, a color of a subject to be tracked is generally different from a color of a background, and a ratio of the subject to be tracked to the reference image RI is relatively higher than a ratio of the background to the reference image RI. Accordingly, a difference between the average color data value of the reference image RI and color data values of pixels in the background of the reference image RI is higher than a difference between the average color data value of the reference image RI and color data values of pixels in the subject to be tracked in the reference image RI. Consequently, by giving the weight of $W_C(i,j)$ to the (i,j) pixel of the one matching image according to the difference between the color data value of a corresponding pixel of the reference image RI and the average color data value of the reference image RI, a target image TI including the subject is effectively determined.

For example, when the color mask is applied to one matching image of the current frame image FI, the color mask gives a weight of 1 to a pixel of the one matching image when an absolute value of a difference between a color data value of a corresponding pixel of the reference image RI and an average color data value in the reference image RI is less than a first predetermined value, and gives a weight less than 1 to the pixel of the one matching image when the absolute value of the difference between the color data value of the corresponding pixel of the reference image RI and the average color data value in the reference image RI is larger than the first predetermined value. This can be expressed as Equation 3 below. Here, k is a constant and the first predetermined value. The first predetermined value may be pre-set by a user, for example, k=1.345σ when the standard deviation of color data in the reference image RI is σ.

$$W_C(i,j) = \begin{cases} 1 & \text{if} |R(i,j) - \overline{R}| < k \\ \dfrac{k}{\text{sgn}(R(i,j) - \overline{R})} & \text{if} |R(i,j) - \overline{R}| > k \end{cases} \quad (3)$$

The matching data obtainer 53 using such a color mask means that the AWCC of each matching image is obtained by using $W_C(i,j)$ of Equation 3, instead of $W_A(i,j)$ of Equation 2. Then, the target image determiner 55 determines one matching image having the largest AWCC as the target image TI.

Meanwhile, even when the (i,j) pixel satisfies $|R(i,j)-\overline{R}|>k$ in Equation 3, the weight of 1 may not be required to be given to the (i,j) pixel. For example, when a person is included as a subject in the reference image RI, and the person is wearing black and white clothes, $\overline{R}$ may be data about gray. In this case, a pixel indicating white or black is the clothes, and thus may be given the weight of 1, but according to Equation 3, the pixel indicating white or black satisfies $|R(i,j)-\overline{R}|>k$ and thus a weight less than 1 may be given to the pixel indicating white or black.

Accordingly, a weight of $$\frac{k}{\text{sgn}(R(i,j) - \overline{R})}$$

is given to the corresponding pixel when a difference between a color data value of one pixel of the reference image RI and an average color data value of the reference image RI is larger than the first predetermined value and satisfies Bayesian decision theory, and a weight of 1 is given to the corresponding pixel when the difference is larger than the first predetermined value and does not satisfy Bayesian decision theory. This can be expressed as Equation 4 below.

$$W_C(i,j) = \begin{cases} 1 & \text{if} |R(i,j) - \overline{R}| < k \\ \dfrac{k}{\text{sgn}(R(i,j) - \overline{R})} & \text{if} |R(i,j) - \overline{R}| > k, \text{ Bayesian decision theory satisfied} \\ 1 & \text{if} |R(i,j) - \overline{R}| > k, \text{ Bayesian decision theory unsatisfied} \end{cases} \quad (4)$$

The Bayesian decision theory may be shown in Equation 5 below.

$$\frac{\sum_{(i,j) \in R_{in}} p(R(i,j) | w_2) p(w_2)}{\sum_{(i,j) \in R_{in}} p(R(i,j))} < \frac{\sum_{(i,j) \in R_{out}} p(R(i,j) | w_2) p(w_2)}{\sum_{(i,j) \in R_{out}} p(R(i,j))} \quad (5)$$

Here, $R_{in}$ denotes a set of pixels having a normalized distance d(i), which is defined as Equation 6 below, between (i,j) and the center of the reference image RI less than a predetermined constant $d_{th}$, and $R_{out}$ denotes a set of pixels having d(i) larger than the predetermined constant $d_{th}$.

$$d(i) = \sqrt{\left(\frac{i - \frac{I}{2}}{\frac{I}{2}}\right)^2 + \left(\frac{j - \frac{J}{2}}{\frac{J}{2}}\right)^2} \quad (6)$$

The predetermined constant $d_{th}$ is defined as $d_{th}=\alpha_C$ by a predetermined constant $\alpha_C$ between 0 and 1. Bayesian decision theory is described in detail in "http://en//wikipedia.org/wiki/Bayes %27_theorem".

In FIG. 8A, when the mask preparer 51 prepares a color mask according to Equation 4 in the reference image of FIG. 7, a pixel is white when the pixel has a value of 1, is black when the pixel as a value of 0, and is gray when the pixel has a value between 0 and 1. When the mask preparer 51 prepares such a color mask, the matching data obtainer 53 obtains matching data by applying the color mask on each of a plurality of matching images within a search range, and the target image determiner 55 determines one of a matching image from among the plurality of matching images as a target image by using the matching data.

When a digital photographing apparatus utilizes the color mask, a target image is accurately determined by using colors of a reference image.

Figure 8B:
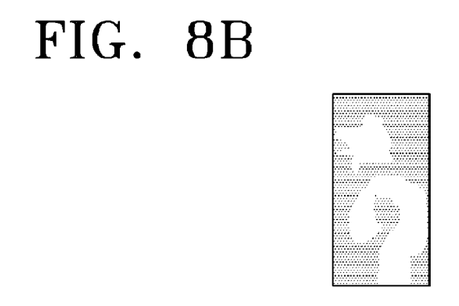
FIG. 8B is a diagram illustrating an example of a difference mask.

FIG. 8B is a diagram illustrating an example of a difference mask. When the difference mask is applied to one matching image of the current frame image FI in the example of FIG. 6, the difference mask gives a weight of $W_D(i,j)$ to an (i,j) pixel of the one matching image, according to a difference between a data value of a corresponding pixel of the reference image RI of the example of FIG. 7 and a data value of a corresponding pixel in a target image of a previous frame image. A subject to be tracked in the current frame image FI and a subject to be tracked in the previous frame image may be different, but since a time interval between adjacent frame images is small, the subjects to be tracked in the current frame image FI and the previous frame image may not be very different in terms of their shapes and/or colors. Accordingly, in order to find a target image in the current frame image FI, a target image found in the previous frame image is used. Meanwhile, a reference image RI and the target image in the previous frame image are not completely identical. Accordingly, by using a difference between the reference image RI and the target image in the previous frame image, the mask preparer 51 prepares a difference mask having a weight of 1 in pixels where the difference is low, and having a weight less than 1 in pixels where the difference is high. The mask preparer 51 may prepare the difference mask as follows.

First, a binary image is prepared by giving a value of 0 to a pixel of the binary image when a difference between a data value of one pixel on the reference image RI and a data value of a corresponding pixel in the target image of the previous frame image is less than a second predetermined value, and by giving a value of 1 to a pixel of the binary image when a difference between the data value of the one pixel on the reference image RI and the data value of the corresponding pixel in the target image of the previous frame image is larger than the second predetermined value. This is expressed as Equation 7 below.

$$M_B(i, j) = \begin{cases} 0 & \text{if } TD(i, j) = |T(i, j) - R(i, j)| < TD_{th} \\ 1 & \text{if } TD(i, j) = |T(i, j) - R(i, j)| > TD_{th} \end{cases} \quad (7)$$

Here, T(i,j) denotes data of an (i,j) pixel of the target image in the previous frame image, R(i,j) denotes data of an (i,j) pixel in the reference image RI, and $TD_{th}$ denotes the second predetermined value.

Then, when $M_B$ denotes the binary image, $\alpha_D$ denotes the predetermined constant between 0 and 1, and CDT(i,j) denotes Chamfer distance transformation of an (i,j) pixel of the binary image, a weight of $$W_D(i, j) = \alpha_D + (1 - \alpha_D) \frac{CDT(i, j)}{\max_{(i,j) \in M_B} (CDT(i, j))}$$

is given to an (i,j) pixel of one matching image, when the difference mask is applied to the one matching image. $\max_{(i,j) \in M_B}(CDT(i,j))$ denotes one of pixels of the binary image having the largest value of Chamber distance transformation. Chamfer distance transformation is described in detail in Gunilla Borgefors, "Distance Transformations in Digital Images", Comput. Vision, Graphics Image process. Vol. 34, pp. 334-37, 1986.

Meanwhile, when the size of a target image is small, the above described $W_D(i,j)$ may be affected by noise, or the like. Accordingly, when $$W_{D0}(i, j) = \alpha_D + (1 - \alpha_D) \frac{CDT(i, j)}{\max_{(i,j) \in M_B} (CDT(i, j))},$$

wherein a third predetermined value $W_{DMAX}$ is a positive value, the difference mask may modify the weight of $W_D(i,j)$ given to an (i,j) pixel of one matching image as follows.

$$W_D(i, j) = \begin{cases} W_{DMAX} & \text{if } W_{D0}(i, j) > W_{DMAX} \\ W_{D0}(i, j) & \text{else} \end{cases} \quad (8)$$

The matching data obtainer 53 using the difference mask means that AWCC of each matching image is obtained by using $W_D(i,j)$ of Equation 8, instead of $W_A(i,j)$ of Equation 2. Then, the target image determiner 55 determines one matching image having the largest AWCC as a target image.

The mask preparer 51 may prepare the difference mask in the example of FIG. 8B according to Equation 8 with respect to the reference image RI of the example of FIG. 7 and the target image TI of the example of FIG. 6. Pixels of the difference mask in white are pixels having a high weight and pixels of the difference mask in gray are pixels having a low weight. When the mask preparer 51 prepares such a difference mask, the matching data obtainer 53 obtains matching data by applying the difference mask to each of a plurality of matching images within a search range, and the target image determiner 55 determines one of the matching images as a target image by using the matching data.

When a digital photographing apparatus uses the difference mask, a target image is accurately determined since a mask is applied to matching images within a search range of a current frame image by using a difference between a reference image and a target image found in a previous frame image.

Figure 8C:
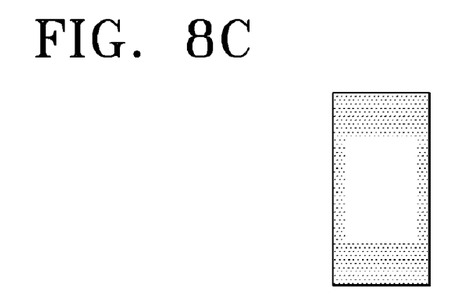
FIG. 8C is a diagram illustrating an example of a resize mask.

FIG. 8C is a diagram illustrating an example of a resize mask. As described above, a reference image, a matching image, and a target image have the same size. When a target image is compared with a reference image, assuming that an ideal target image is determined, a part of the target image may considerably correspond to a corresponding part of the reference image, but another part of the target image may not considerably correspond to a corresponding part of the reference image. Accordingly, while searching for a target image, a part of a matching image that may considerably correspond to the target image may be given a bigger weight than other parts of the matching image. However, since a target image is not known in a current frame image, a target image determined in a previous frame image is applied in the current frame image.

In detail, when the resize mask is applied to one matching image of a current frame image, the resize mask gives a weight of 1 to pixels of the one matching image corresponding to a rectangular area and gives a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric. The rectangular area among the plurality of rectangular areas is determined by using NCC, as Equation 9.

$$(i^*, j^*) = \arg\max_{i,j} NCC(R^{i,j}, T^{i,j}), i_{min} \leq i \leq i_{max}, \\ j_{min} \leq j \leq j_{max} \quad (9)$$

Here, $R^{\hat{I},\hat{J}}$ denotes an area having a width of $\hat{I}$ and a length of $\hat{J}$ based on the center of the reference image in the reference image, $T^{\hat{I},\hat{J}}$ denotes an area having a width of $\hat{I}$ and a length of $\hat{J}$ based on the center of the target image in the target image of the previous frame image. When (i*,j*) denotes $(\hat{I},\hat{J})$ giving the maximum NCC after calculating each NCC while changing the size of the area, and $W_R(i,j)$ denotes a weight given to an (i,j) pixel of one matching image of the current frame image when the resize mask is applied to the one matching image, $W_R(i,j)$ is calculated as given by Equation 10 below.

$$W_R(i, j) = \begin{cases} 1 & \text{if } i < i^* \text{ and } j < j^* \\ \alpha_R & \text{else} \end{cases} \quad (10)$$

Here, $\alpha_R$ denotes a constant less than 1.

The matching data obtainer 53 using such a resize mask means that AWCC of each matching image is obtained by using $W_R(i,j)$ of Equation 10 instead of $W_A(i,j)$ of Equation 2. The target image determiner 55 determines one matching image having the largest AWCC as the target image.

The resize mask of the example of FIG. 8C may be obtained by the mask preparer 51 according to Equations 9 and 10, with respect to the reference image RI of the example of FIG. 7 and the target image TI of the example of FIG. 6. Pixels of the resize mask in white are pixels having a weight of 1, and pixels of the resize mask in gray are pixels having a weight less than 1. When the mask preparer 51 prepares such a resize mask, the matching data obtainer 53 obtains matching data by applying the resize mask on each of a plurality of matching images within a search range, and the target image determiner 55 determines one of the matching images as a target image by using the matching data.

When a digital photographing apparatus uses such a resize mask, a mask is applied to matching images within a search range of a current frame image by using a difference between a reference image and a target image found in a previous frame image, and thus a target image is accurately determined.

Figure 8D:
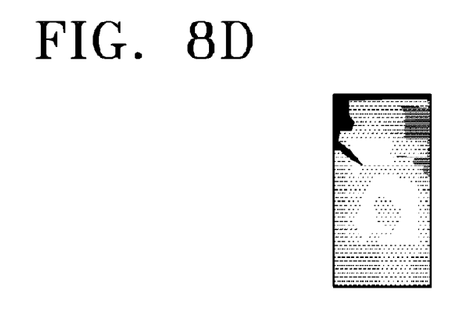
FIG. 8D is a diagram illustrating an example of an integrated mask.

The mask preparer 51 prepares one of the color mask, the difference mask, and the resize mask, the matching data obtainer 53 obtains matching data by using the mask prepared by the mask preparer 51, and the target image determiner 55 determines one of matching images as a target image. Alternatively, the mask preparer 51 prepares an integrated mask, wherein any two of the color mask, the difference mask, and the resize mask are integrated, the matching data obtainer 53 obtains matching data by using the integrated mask prepared by the mask preparer 51, and the target image determiner 55 determines one matching image as a target image. For example, $W_A(i,j)=W_C(i,j) \cdot W_D(i,j)$ may be used. Alternatively, the mask preparer 51 prepares an integrated mask, wherein all of the color mask, the difference mask, and the resize mask are integrated, the matching data obtainer 53 obtains matching data by using the integrated mask prepared by the mask preparer 51, and the target image determiner 55 determines one of matching images as a target image. For example, $W_A(i,j)=W_C(i,j) \cdot W_D(i,j) \cdot W_R(i,j)$ may be used. FIG. 8D is a diagram illustrating an example of an integrated mask, wherein $W_A(i,j)=W_C(i,j) \cdot W_D(i,j) \cdot W_R(i,j)$.

Meanwhile, the matching data is obtained and the target image is determined by applying $W_A(i,j)$ as Equation 2 with respect to NCC as Equation 1, and thus a method of obtaining matching data for applying $W_A(i,j)$ is not limited to NCC. In other words, a sum of squared differences (SSD), a sum of absolute differences (SAD) or a mean of absolute differences (MAD) may be used as a method of obtaining matching data.

$$SSD = \sum_{i=0}^{I-1} \sum_{j=0}^{J-1} (R(i,j) - (M(i,j))^2 \quad (11)$$

$$SAD = \sum_{i=0}^{I-1} \sum_{j=0}^{J-1} |R(i,,j) - M(i,,j)| \quad (12)$$

$$MAD = \frac{1}{I \cdot J} \sum_{i=0}^{I-1} \sum_{j=0}^{J-1} |R(i,j) - M(i,j)| \quad (13)$$

The digital photographing apparatus according to the embodiment of the present invention may use SSD, SAD, or MAD by giving a weight of $W_A(i,j)$ as follows.

$$ASSD = \sum_{i=0}^{I-1} \sum_{j=0}^{J-1} W_A(i,j)(R(i,j) - (M(i,j))^2 \quad (14)$$

$$ASAD = \sum_{i=0}^{I-1} \sum_{j=0}^{J-1} W_A(i,j)|R(i,,j) - M(i,,j)| \quad (15)$$

$$AMAD = \frac{1}{I \cdot J} \sum_{i=0}^{I-1} \sum_{j=0}^{J-1} W_A(i,j)|R(i,j) - M(i,j)| \quad (16)$$

Also, other various methods of obtaining matching data may be used by adding a weight of $W_A(i,j)$.

In a plurality of frame images, a target image may not be considered important, as a subject in the target image may move. Accordingly, when a certain subject is tracked by continuously using a reference image that is initially determined, images between the reference image and a frame image of the certain subject may be different. Consequently, the certain subject may not be accurately tracked when the reference image is continuously used. Thus in the digital photographing apparatus of the current embodiment of the present invention, the reference image may be suitably updated as follows.

When $W_A(i,j)$ denotes a weight given to an (i,j) pixel of a matching image by a mask prepared by the mask preparer 51, $W_U(i,j)$ has a fifth predetermined value $W_{UMAX}$ when $W_A(i,j)$ is larger than a fourth predetermined value $W_{AMAX}$, has a seventh predetermined value $W_{UMIN}$ when $W_A(i,j)$ is equal to or less than a sixth predetermined value $W_{AMIN}$, and otherwise has a value of $W_A(i,j)$. For example, when $W_{UMIN}$=L, a pixel having a low weight may not be updated, because when an object is hidden by a background, the background prevents a pixel of the object from being updated. This is expressed as Equation 17 below.

$$W_U(i,,j) = \begin{cases} W_{UMAX} & \text{if } W_A(i,j) > W_{AMAX} \\ W_{UMIN} & \text{else if } W_A(i,,j) < W_{AMIN} \\ W_A(i,j) & \text{otherwise} \end{cases} \quad (17)$$

When $R_t(i,j)$ denotes an (i,j) pixel of a reference image applied to a current frame image, $R_{t+1}(i,j)$ denotes an (i,j) pixel of a reference image applied to a following frame image, and $T_t(i,j)$ denotes an (i,j) pixel of a target image determined in the current frame image, $R_{t+1}(i,j)$ of a reference image to be applied to the following frame image may be updated as Equation 18.

$$R_{t+1}(i,j)=W_U(i,j)R_t(i,j)+(1-W_U(i,j))T_t(i,j) \quad (18)$$

As such, by updating a reference image, a certain subject is effectively tracked.

Figure 9:
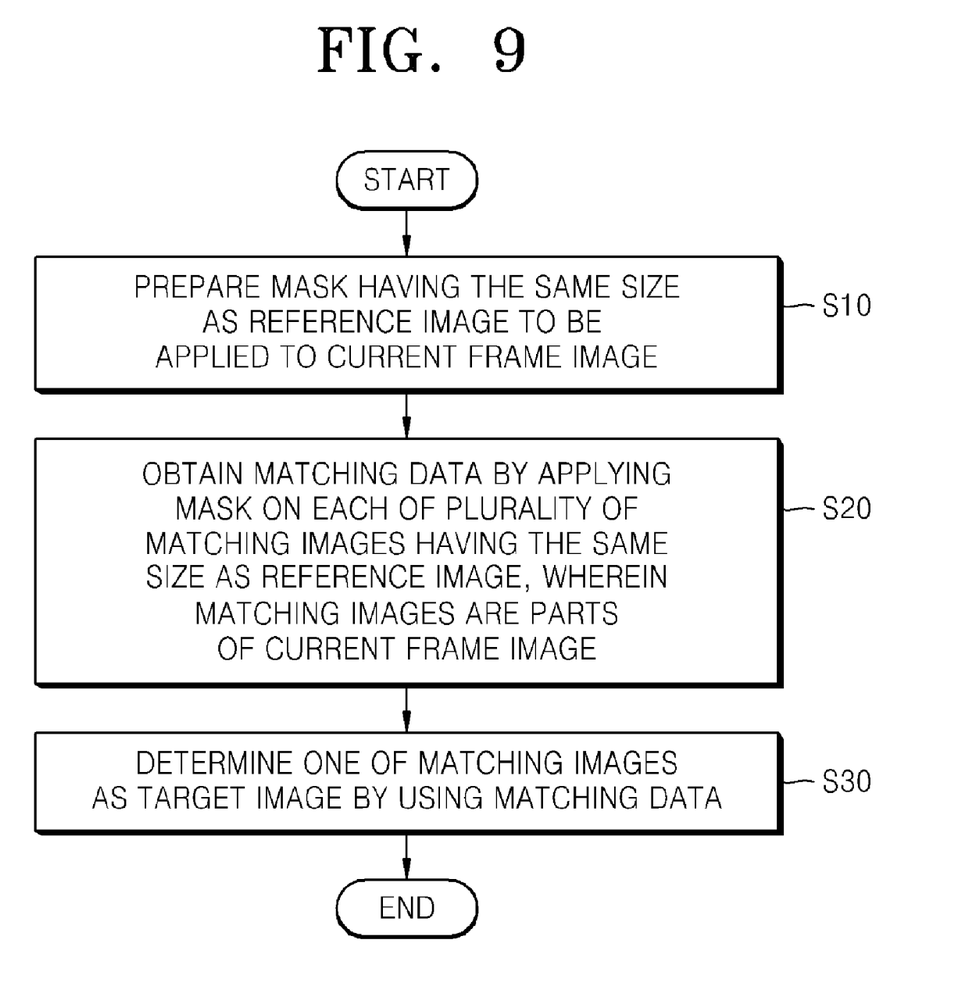
FIG. 9 is a flowchart showing an example of a tracking method according to an embodiment of the present invention.

FIG. 9 is a flowchart showing an example of a tracking method according to an embodiment of the present invention. Referring to the example of FIG. 9, a mask having the same size as a reference image is prepared in operation S10 to apply the mask to a current frame image. Then in operation S20, a plurality of pieces of matching data are obtained by applying the mask to each of a plurality of matching images having the same size as the reference image, wherein the plurality of matching images are parts of the current frame image. Next in operation S30, one of the plurality of matching images is determined as a target image, by using the plurality of pieces of matching data.

Here, the mask prepared in operation S10 may include at least one of the color mask, the difference mask, and the resize mask described above. By using the mask, a certain subject is effectively tracked. Also, tracking of the certain subject may remarkably improve by appropriately updating the reference image as described above.

When applied to one matching image of the current frame image, the color mask gives a weight of $W_C(i,j)$ to an $(i,j)$ pixel of the one matching image, according to a difference between a color data value of a corresponding pixel of the reference image and an average color data value of the reference image. In detail, when the color mask is applied to the one matching image of the current frame image, a weight of 1 is given to a pixel of the one matching image when a difference between a color data value of a corresponding pixel of the reference image and the average color data value of the reference image is less than a first predetermined value, and a weight less than 1 is given to a pixel of the one matching image when a difference between a color data value of a corresponding pixel of the reference image and the average color data value of the reference image is larger than the first predetermined value. In more detail, a weight of $$\frac{k}{sng(R(i,j)-\overline{R})}$$

is given to a pixel of the one matching image when a difference between a color data value of a corresponding pixel of the reference image and the average color data value of the reference image is larger than the first predetermined value and satisfies Bayesian decision theory, and a weight of 1 is given to the pixel of the one matching image when the difference is larger than the first determined value and does not satisfy Bayesian decision theory, wherein k denotes a predetermined constant, $R(i,j)$ denotes a color data value of an $(i,j)$ pixel of the reference image, and $\overline{R}$ denotes the average color data value of the reference image.

When the difference mask is applied to one matching image of the current frame image, the difference mask prepares a binary image by giving a weight of 0 to a pixel of the binary image when a difference between a data value of a pixel of the reference image and a data value of a corresponding pixel of a target image in a previous frame image is less than a second predetermined value, and giving a weight of 1 to a pixel of the binary image when the difference is larger than the second predetermined value. Then, a weight of $$\alpha_D+(1-\alpha_D)\frac{CDT(i,j)}{max_{(i,j)\in M_B}(CDT(i,j))}$$

is given to a corresponding pixel of the one matching image, wherein $M_B$ denotes the binary image, $\alpha_D$ denotes a predetermined constant between 0 and 1, and $CDT(i,j)$ denotes Chamfer distance transformation of an $(i,j)$ pixel of the binary image. Here, when the weight of $$\alpha_D+(1-\alpha_D)\frac{CDT(i,j)}{max_{(i,j)\in M_B}(CDT(i,j))}$$

is given to the corresponding pixel of the one matching image, when a value of $$\alpha_D+(1-\alpha_D)\frac{CDT(i,j)}{max_{(i,j)\in M_B}(CDT(i,j))}$$

is larger than a third predetermined value, the corresponding pixel of the one matching image may be given a weight of the third predetermined value.

When the resize mask is applied to one matching image of the current frame image, the resize mask gives a weight of $W_R(i,j)$ to an $(i,j)$ pixel of the one matching image by giving a weight of 1 to pixels of the one matching image corresponding to one of a plurality of rectangular areas and by giving a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric.

According to the tracking method, a certain subject is effectively tracked by using the mask as described above.

A shape, a size, and/or colors of the certain subject to be tracked may change, and thus the reference image used for tracking the certain subject is appropriately updated. Accordingly, according to the tracking method, when $W_A(i,j)$ denotes a weight given to an $(i,j)$ pixel of the matching image by the mask prepared in operation S10, $W_U(i,j)$ has a fifth predetermined value $W_{UMAX}$ when the $W_A(i,j)$ is larger than a fourth predetermined value $W_{AMAX}$, has a seventh predetermined value $W_{UMIN}$ when $W_A(i,j)$ is equal to or less than a sixth predetermined value $W_{AMIN}$, and otherwise has a value of $W_A(i,j)$, and a reference image to be applied to a following frame image is updated according to $R_{t+1}(i,j)=W_U(i,j)R_t(i,j)+(1-W_U(i,j))T_t(i,j)$, wherein $R_t(i,j)$ denotes an $(i,j)$ pixel of the reference image, $R_{t+1}(i,j)$ denotes an $(i,j)$ pixel of the reference image to be applied in the following frame image, and $T_t(i,j)$ denotes an $(i,j)$ pixel of a target image determined in the current frame image.

A program for executing the tracking method in a digital photographing apparatus may be stored in a recording medium. In this regard, the recording medium may be the storage medium 70 as shown in FIG. 1, the memory 60 as shown in the example of FIG. 1, or a separate recording medium. Examples of the recording medium include magnetic storage media (for example, ROM, floppy disks, hard disks, and the like), and optical recording media (for example, CD-ROMS, or DVDS).

According to the digital photographing apparatus, the tracking method, and the recording medium having recorded thereon a program for executing the tracking method of the present invention, a target image, as a partial image corresponding to a reference image in a frame image, is effectively determined.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
an image pickup device which generates data from incident light;
a mask preparer which prepares a mask having the same size as a reference image that is smaller than a current frame image, the mask to be applied to the current frame image to search for a target image that matches the reference image in the current frame image;
a matching data obtainer which obtains a plurality of pieces of matching data by applying the mask to a plurality of matching images having the same size as the reference image, the plurality of matching images being parts of the current frame image; and
a target image determiner which determines one of the matching images as a target image by using the matching data,
wherein the mask preparer prepares at least one of:
a color mask which, when applied to one matching image of the current frame image, gives a weight $W_c(i,j)$ to an (i,j) pixel of the one matching image according to a difference between a color data value of a corresponding pixel of the reference image and an average color data value of the reference image;
a difference mask which, when applied to one matching image of the current frame image, gives a weight $W_D(i,j)$ to an (i,j) pixel of the one matching image according to a difference between a data value of a corresponding pixel of the reference image and a data value of a corresponding pixel of a target image in a previous frame image; and
a resize mask which, when applied to one matching image of the current frame image, gives a weight $W_R(i,j)$ to an (i,j) pixel, by giving a weight of 1 to pixels of the one matching image corresponding to a rectangular area and giving a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric.

2. The digital photographing apparatus of claim 1, wherein the color mask, when applied to one matching image of the current frame image, gives a weight of 1 to a pixel of the one matching image when a difference between a color data value of a corresponding pixel of the reference image and an average color data value in a predetermined area of the reference image is less than a first predetermined value, and
gives a weight less than 1 to the pixel of the one matching image when the difference between the color data value of the corresponding pixel of the reference image and the average color data value in the predetermined area of the reference image is larger than the first predetermined value.

3. The digital photographing apparatus of claim 1, wherein the color mask, when applied to one matching image of the current frame image, gives a weight of 1 to a pixel of the one matching image when a difference between a color data value of a corresponding pixel of the reference image and an average color data value in a predetermined area of the reference image is less than a first predetermined value, gives a weight of $$\frac{k}{sng(R(i,j) - \overline{R})}$$

to the pixel of the one matching image when the difference between the color data value of the corresponding pixel of the reference image and the average color data value in the predetermined area of the reference image is larger than the first predetermined value and Bayesian decision theory is satisfied, wherein k denotes a predetermined constant, $R(i,j)$ denotes a color data value of an (i,j) pixel as the one pixel of the reference image, and $\overline{R}$ denotes the average color data value in the predetermined area of the reference image, and
gives a weight of 1 to the pixel of the one matching image when the difference between the color data value of the corresponding pixel of the reference image and the average color data value in the predetermined area of the reference image is larger than the first predetermined value and Bayesian decision theory is not satisfied.

4. The digital photographing apparatus of claim 1, wherein the difference mask, when applied to one matching image of the current frame image, prepares a binary image by giving a value of 0 to a pixel of the binary image when a difference between a data value of one pixel of the reference image and a data value of a corresponding pixel in a target image in a previous frame image is less than a second predetermined value, and giving a value of 1 to a pixel of the binary image when the difference between the data value of the one pixel of the reference image and the data value of the corresponding pixel in the target image in the previous frame image is larger than the second predetermined value, and then gives a weight of $$\alpha_D + (1 - \alpha_D)\frac{CDT(i,j)}{max_{(i,j)\in M_B}(CDT(i,j))}$$

to a corresponding pixel of the one matching image, wherein $M_B$ denotes the binary image, $\alpha_D$ denotes a predetermined constant between 0 and 1, and $CDT(i,j)$ denotes a Chamfer distance transformation of an (i,j) pixel of the binary image.

5. The digital photographing apparatus of claim 4, wherein when a weight of $$\alpha_D + (1 - \alpha_D)\frac{CDT(i,j)}{max_{(i,j)\in M_B}(CDT(i,j))}$$

is given to the corresponding pixel of the one matching image, a weight of a third predetermined value is given to the corresponding pixel when the value of $$\alpha_D + (1-\alpha_D)\frac{CDT(i,j)}{max_{(i,j)\in M_B}(CDT(i,j))}$$

is larger than the third predetermined value.

6. The digital photographing apparatus of claim 1, wherein when $W_A(i,j)$ denotes a weight given to an (i,j) pixel of the matching image by the mask prepared by the mask preparer, $W_U(i,j)$ has a fifth predetermined value $W_{UMAX}$ when the $W_A(i,j)$ is larger than a fourth predetermined value $W_{AMAX}$, has a seventh predetermined value $W_{UMIN}$ when $W_A(i,j)$ is equal to or less than a sixth predetermined value $W_{AMIN}$, and has a value of $W_A(i,j)$ in other cases, and a reference image to be applied to a following frame image is determined according to $R_{t+1}(i,j)=W_U(i,j)R_t(i,j)+(1-W_U(i,j))T_t(i,j)$, wherein $R_t(i,j)$ denotes an (i,j) pixel of the reference image, $R_{t+1}(i,j)$ denotes an (i,j) pixel of the reference image to be applied in the following frame image, and $T_t(i,j)$ denotes an (i,j) pixel of a target image determined in the current frame image.

7. A tracking method of searching for a target image that corresponds the most to a reference image that is smaller than a current frame image in the current frame image, the tracking method comprising:
 preparing a mask having the same size as the reference image and to be applied to the current frame image;
 obtaining a plurality of pieces of matching data by applying the mask to each of a plurality of matching images having the same size as the reference image, the plurality of matching images being parts of the current frame image; and
 determining one of the plurality of matching images as a target image by using the plurality of pieces of the matching data,
 wherein the mask comprises at least any one of:
 a color mask which, when applied to one matching image of the current frame image, gives a weight $W_C(i,j)$ to an (i,j) pixel of the one matching image according to a difference between a color data value of a corresponding pixel of the reference image and an average color data value of the reference image;
 a difference mask which, when applied to one matching image of the current frame image, gives a weight $W_D(i,j)$ to an (i,j) pixel of the one matching image according to a difference between a data value of a corresponding pixel of the reference image and a data value of a corresponding pixel of a target image in a previous frame image; and
 a resize mask which, when applied to one matching image of the current frame image, gives a weight $W_R(i,j)$ to an (i,j) pixel, by giving a weight of 1 to pixels of the one matching image corresponding to a rectangular area and giving a weight less than 1 to other pixels of the one matching image, wherein the rectangular area is selected among a plurality of rectangular areas concentric with the reference image, the reference image and a target image in a previous frame image showing highest accordance in the rectangular area among the plurality of rectangular areas when the reference image and the target image in the previous frame image area matched to be concentric.

8. The tracking method of claim 7, wherein the color mask, when applied to one matching image of the current frame image, gives a weight of 1 to a pixel of the one matching image when a difference between a color data value of a corresponding pixel of the reference image and an average color data value in a predetermined area of the reference image is less than a first predetermined value, and
 gives a weight less than 1 to the pixel of the one matching image when the difference between the color data value of the corresponding pixel of the reference image and the average color data value in the predetermined area of the reference image is larger than the first predetermined value.

9. The tracking method of claim 7, wherein the color mask, when applied to one matching image of the current frame image, gives a weight of 1 to a pixel of the one matching image when a difference between a color data value of a corresponding pixel of the reference image and an average color data value in a predetermined area of the reference image is less than a first predetermined value,
 gives a weight of $$\frac{k}{sng(R(i,j)-\overline{R})}$$

to the pixel of the one matching image when the difference between the color data value of the corresponding pixel of the reference image and the average color data value in the predetermined area of the reference image is larger than the first predetermined value and Bayesian decision theory is satisfied, wherein k denotes a predetermined constant, $R(i,j)$ denotes a color data value of an (i,j) pixel as the one pixel of the reference image, and $\overline{R}$ denotes the average color data value in the predetermined area of the reference image, and
 gives a weight of 1 to the pixel of the one matching image when the difference between the color data value of the corresponding pixel of the reference image and the average color data value in the predetermined area of the reference image is larger than the first predetermined value and Bayesian decision theory is not satisfied.

10. The tracking method of claim 7, wherein the difference mask, when applied to one matching image of the current frame image, prepares a binary image by giving a value of 0 to a pixel of the binary image when a difference between a data value of one pixel of the reference image and a data value of a corresponding pixel in a target image in a previous frame image is less than a second predetermined value, and giving a value of 1 to a pixel of the binary image when the difference between the data value of the one pixel of the reference image and the data value of the corresponding pixel in the target image in the previous frame image is larger than the second predetermined value, and then gives a weight of $$\alpha_D + (1-\alpha_D)\frac{CDT(i,j)}{max_{(i,j)\in M_B}(CDT(i,j))}$$

to a corresponding pixel of the one matching image, wherein $M_B$ denotes the binary image, $\alpha_D$ denotes a predetermined constant between 0 and 1, and $CDT(i,j)$ denotes a Chamfer distance transformation of an (i,j) pixel of the binary image.

11. The tracking method of claim 10, wherein when a weight of $$\alpha_D + (1-\alpha_D)\frac{CDT(i,j)}{max_{(i,j)\in M_B}(CDT(i,j))}$$

is given to the corresponding pixel of the one matching image, a weight of a third predetermined value is given to the corresponding pixel when the value of $$\alpha_D + (1-\alpha_D)\frac{CDT(i,j)}{max_{(i,j)\in M_B}(CDT(i,j))}$$

is larger than the third predetermined value.

12. The tracking method of claim 7, wherein when $W_A(i,j)$ denotes a weight given to an (i,j) pixel of the matching image by the mask, $W_U(i,j)$ has a fifth predetermined value $W_{UMAX}$ when the $W_A(i,j)$ is larger than a fourth predetermined value $W_{AMAX}$, has a seventh predetermined value $W_{UMIN}$ when $W_A(i,j)$ is equal to or less than a sixth predetermined value $W_{AMIN}$, and has a value of $W_A(i,j)$ in other cases, and a reference image to be applied to a following frame image is determined according to $R_{t+1}(i,j)=W_U(i,j)R_t(i,j)+(1-W_U(i,j))T_t(i,j)$, wherein $R_t(i,j)$ denotes an (i,j) pixel of the reference image, $R_{t+1}(i,j)$ denotes an (i,j) pixel of the reference image to be applied in the following frame image, and $T_t(i,j)$ denotes an (i,j) pixel of a target image determined in the current frame image.

13. A non-transitory computer readable medium having recorded thereon a program for executing the tracking method of claim 7.

* * * * *